United States Patent
Vande Sande et al.

(10) Patent No.: US 9,375,814 B2
(45) Date of Patent: Jun. 28, 2016

(54) SYSTEM AND METHOD FOR RESTRAINING A VEHICLE WITH INTEGRATED MANDREL AND TRACK LOCK PIN

(71) Applicants: Jerry W. Vande Sande, Dallas, TX (US); Robert J. Cencer, Tipton, MI (US)

(72) Inventors: Jerry W. Vande Sande, Dallas, TX (US); Robert J. Cencer, Tipton, MI (US)

(73) Assignee: Trinity Parts & Components, LLC, Dallas, TX (US)

( * ) Notice: Subject to any disclaimer, the term of this patent is extended or adjusted under 35 U.S.C. 154(b) by 82 days.

(21) Appl. No.: 14/165,984

(22) Filed: Jan. 28, 2014

(65) Prior Publication Data
US 2015/0210200 A1    Jul. 30, 2015

(51) Int. Cl.
| | |
|---|---|
| *B60P 3/08* | (2006.01) |
| *B23P 19/04* | (2006.01) |
| *B60P 3/077* | (2006.01) |
| *B60P 3/075* | (2006.01) |

(52) U.S. Cl.
CPC ............... *B23P 19/04* (2013.01); *B60P 3/075* (2013.01); *B60P 3/077* (2013.01); *Y10T 29/49901* (2015.01)

(58) Field of Classification Search
CPC .............. B61D 3/18; B61D 7/02; B61D 7/28; B61D 3/04; B61D 3/02; B60P 3/08; B60P 3/079; B60P 3/077; B60P 3/075; B60P 7/0846; B60P 7/0861; Y10T 29/49716
USPC ........... 410/26, 20, 24, 29, 12, 10, 100, 23, 3, 410/30, 7; 296/106; 414/812; 248/499; 188/32; 254/217, 223
See application file for complete search history.

(56) References Cited

U.S. PATENT DOCUMENTS

| | | | | |
|---|---|---|---|---|
| 4,960,353 | A * | 10/1990 | Thorndyke | B60P 3/075 410/10 |
| 5,277,407 | A * | 1/1994 | Mayne | B60P 3/073 24/68 CD |
| 6,171,037 | B1 * | 1/2001 | Andre | B60P 3/075 410/10 |
| 7,513,725 | B1 | 4/2009 | Bullock | |
| 7,682,114 | B2 * | 3/2010 | Howes | B60P 3/075 410/100 |
| 7,824,138 | B2 * | 11/2010 | Bullock | B60P 3/075 410/10 |
| 8,047,751 | B2 * | 11/2011 | Powers | B60T 3/00 410/10 |
| 8,430,612 | B1 | 4/2013 | Randall | |
| 8,517,646 | B2 * | 8/2013 | Cencer | B60P 3/077 410/12 |

(Continued)

OTHER PUBLICATIONS

International Search Report and Written Opinion for International Application No. PCT/US2015/013008, Jun. 5, 2015.
International Search Report and Written Opinion issued in PCT/US2015/013008; 10 pages, Jun. 5, 2015.

*Primary Examiner* — Glenn Dayoan
*Assistant Examiner* — Sunsurraye Westbrook
(74) *Attorney, Agent, or Firm* — Baker Botts, LLP

(57) ABSTRACT

A vehicle restraint system includes a strap assembly configured to be positioned on a portion of a tire of a vehicle to secure the vehicle to a track assembly. The strap assembly is also configured to be coupled to the track assembly on a first side of the tire. The system also includes a mandrel assembly operable to be coupled to the strap assembly on a second side of the tire, opposite the first side of the tire. The mandrel assembly is configured to engage the track assembly through a first hole in the track assembly. The system further includes a latch assembly configured to be coupled to the mandrel assembly. The latch assembly is also configured to create a coupling between the mandrel assembly and the track assembly.

20 Claims, 10 Drawing Sheets

(56) References Cited

U.S. PATENT DOCUMENTS

2004/0144964 A1* 7/2004 Boice .................. B60P 3/075
 254/223

2006/0263161 A1 11/2006 Howes et al.
2014/0212239 A1* 7/2014 Cencer ................ B60P 7/0846
 410/20

* cited by examiner

SYSTEM AND METHOD FOR RESTRAINING A VEHICLE WITH INTEGRATED MANDREL AND TRACK LOCK PIN

BACKGROUND OF THE INVENTION

1. Field of the Invention

The disclosure relates generally to restraining a vehicle, and more particularly to systems and methods for restraining a vehicle with an integrated mandrel and track lock pin.

2. Description of Related Art

Automobile manufacturers often ship vehicles via railroad lines on single or multi-deck rail cars. Methods for restraining vehicles on industrial shipping routes are frequently employed to prevent injury to rail-line employees, and to prevent vehicles from being damaged from contact with rail equipment or other freight. Traditionally, these methods for restraining vehicles include a tie down system to secure a wheel of the automobile to the deck of the transport. Sometimes, these tie downs include a chock and strap configuration for securing the tire of a vehicle in place on the shipping vessel.

Manufacturers are constantly improving automobile designs in order to increase the performance and efficiency of their products. For example, automobile manufacturers have been reducing the tire-to-fender clearance ratios of their vehicles in an effort to decrease aerodynamic drag and increase performance and fuel efficiency.

Sometimes, these design changes are incompatible with current shipping restraint mechanisms. For example, traditional chock and strap configurations may not be designed to effectively secure vehicles with low tire-to-fender clearance ratios. Further, on vehicles with low tire-to-fender clearance ratios, the tightening process on traditional restraint mechanisms may cause the chock body to interfere with and damage the vehicle's fender.

SUMMARY OF THE INVENTION

According to one configuration, a vehicle restraint system includes a strap assembly configured to be positioned on a portion of a tire of a vehicle to secure the vehicle to a track assembly. The strap assembly is also configured to be coupled to the track assembly on a first side of the tire. The system also includes a mandrel assembly operable to be coupled to the strap assembly on a second side of the tire, opposite the first side of the tire. The mandrel assembly is configured to engage the track assembly through a first hole in the track assembly. The system further includes a latch assembly configured to be coupled to the mandrel assembly. The latch assembly is also configured to create a coupling between the mandrel assembly and the track assembly.

Other objects, features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

DETAILED DESCRIPTION

Preferred embodiments of the present invention, and their features and advantages, may be understood by referring to FIGS. 1-10, like numerals being used for corresponding parts in the various drawings.

Figure 1:
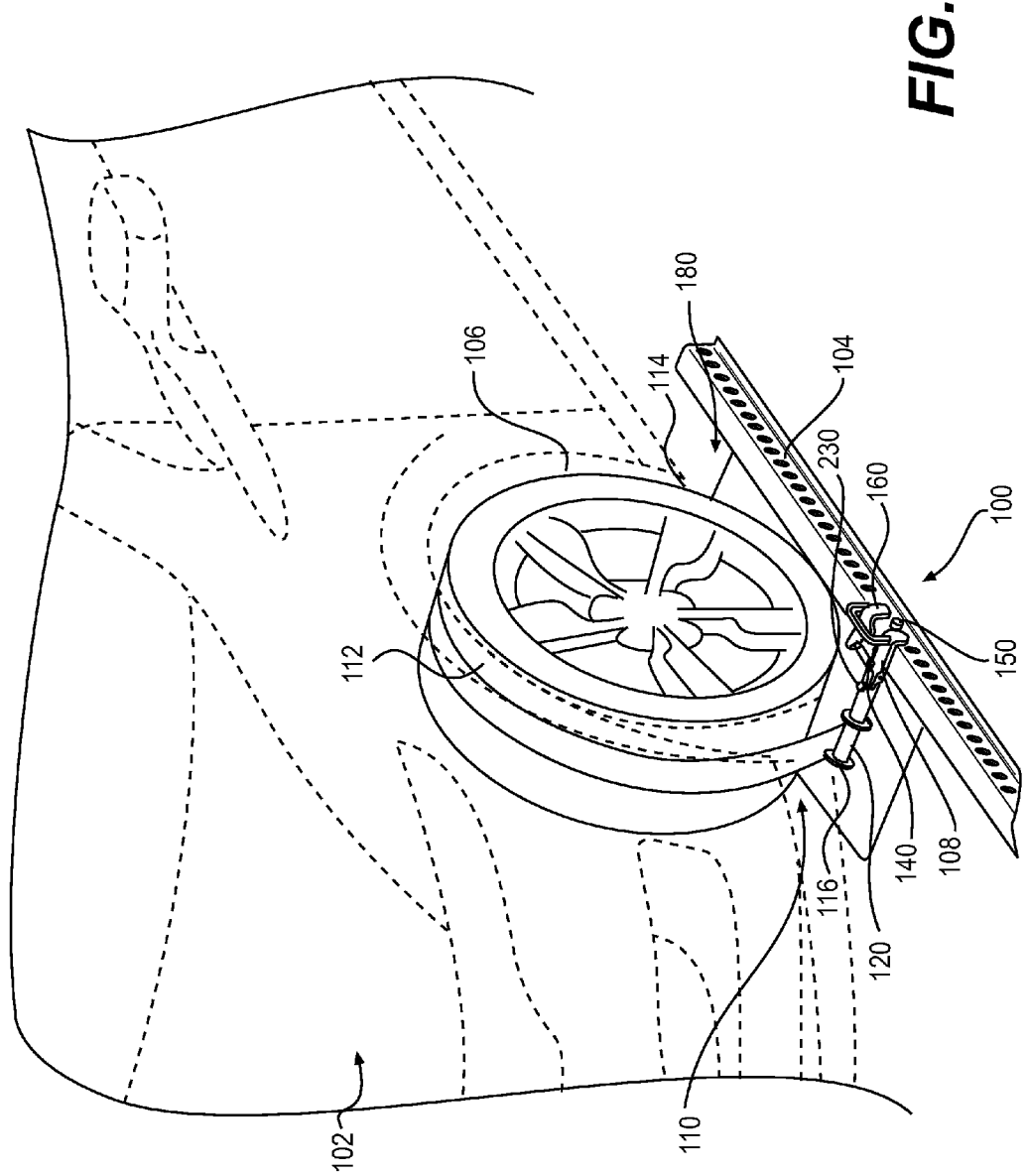
FIG. 1 illustrates an isometric view of a vehicle restraint system in a railway car in accordance with a particular non-limiting configuration.

FIG. 1 illustrates an isometric view of a vehicle restraint system 100 for restraining a vehicle with an integrated mandrel 120 and lock pin 150 as implemented in an industrial freight shipping railway car 180. In certain embodiments, vehicle restraint system 100 includes a strap assembly 110, a mandrel assembly 120, a winch 140, a lock pin 150 and an attachment assembly 160. Strap assembly 110 wraps around a portion of tire 106 and attaches to a chock on a first side of wheel 106. Strap assembly 110 is secured to mandrel assembly 120, winch 140, lock pin 150 and attachment assembly 160. Attachment assembly 160 attaches lock pin 150 in place on chock track 104 when lock pin 150 is engaged with a hole on chock track 104. Attachment assembly 140 may be hinged and may rotate over the top of chock track 104 to secure vehicle restraint system 100 in place on chock track 104. Chock track 104 is secured to the deck of rail car 180. Thus, strap assembly 110, mandrel assembly 120, winch 140, and lock pin 150 are all secured to the deck of rail car 180 via chock track 104. When strap assembly 110 is tightened against a portion of tire 106, vehicle 102 is secured to the deck of rail car 180.

In certain embodiments, lock pin 150 is integrated into mandrel assembly 120 such that lock pin 150 and mandrel assembly 120 are coaxial. For example, mandrel assembly 120 may include a cylindrical steel rod with a strap assembly receiving section on a first side of mandrel assembly 120. The mandrel assembly may extend straight through a hole in track assembly 104 to attach the vehicle restraint system to track assembly 104. Thus, mandrel assembly 120 and lock pin 150 may be integrated into the same steel rod.

In certain embodiments, the coaxial nature of lock pin 150 and mandrel assembly 120 may refer to lock pin 150 and mandrel assembly 120 sharing a common axis of rotation. For example, mandrel assembly 120 may include a cylinder body. Mandrel assembly 120 may rotate on the axis of the cylinder body. Lock pin 150 may also include a cylinder body. Lock pin 150 may rotate on the axis of the cylinder body. In certain embodiments, mandrel assembly 120 cylinder body axis and lock pin 150 cylinder body axis are coaxial, such that mandrel assembly 120 and lock pin 150 share the same axis line.

In certain embodiments, mandrel assembly 120 may contain telescopic sections that vary in diameter. For example, mandrel assembly 120 may contain a second cylinder that is either narrower or wider in diameter than the strap assembly receiving section of mandrel assembly 120. In certain embodiments, these telescopic sections may fit through a track assembly 140 hole. For example, lock pin 150 may be narrower in diameter than mandrel assembly 120 strap receiving section. Lock pin 150 may telescopically fit within mandrel assembly 120, and may fit within a hole in chock track 104. In this example, lock pin 150 is coaxial with mandrel assembly 120 strap assembly receiving section.

As another example, a narrow cylinder lock pin 150 fits within a wider cylinder of mandrel assembly 120. The narrower diameter of lock pin 150 may fit inside track assembly 104. Lock pin 150 and mandrel assembly 120 may be fused and/or welded together.

In certain embodiments, an operator may rotate lock pin 150 in order to tighten strap assembly 110 around a portion 112 of tire 106. Lock pin 150 and mandrel assembly 120 may be coupled together such that the torque force received by lock pin 150 is transmitted to mandrel assembly 120. Mandrel assembly 120 strap assembly receiving section may rotate to tighten strap assembly 110 around tire 106 of vehicle 102.

In certain embodiments, strap assembly 110 is tightened by rotating an end of lock pin 150 that extends beyond a second side 112 of chock track 104. As lock pin 150 is rotated, the torque force is transferred to mandrel assembly 120 that tightens strap assembly 110 around a portion of tire 106.

In certain embodiments, a winch assembly configured on mandrel assembly 120 locks the tightening force in place. For example, the tightening force may be locked in place by ratchet pawls that interlock with winch assembly 140 gear.

In certain embodiments attachment assembly 160 couples vehicle restraint system 100 in place on chock track 104. For example, the illustration in FIG. 1 shows a hinged attachment assembly 160 engaged with a first and second side of chock track 104. At least a portion of attachment assembly 160 may be set on hinges and may swing into place around both sides of chock track 104. When lock pin 150 and attachment assembly 160 are engaged with chock track 104, attachment assembly 160 may prevent vehicle restraint system 100 from moving in a transverse direction. Attachment assembly 160 may also prevent vehicle restraint system 100 from rotating around mandrel assembly 120. Attachment assembly 160 may also prevent vehicle restraint system 100 from moving in the direction of the axis of the mandrel assembly 160. Thus, in certain embodiments, attachment assembly 160 may prevent mandrel assembly 120 from moving axially, radially, and/or transversely with respect to the mandrel assembly axis.

In certain embodiments, a rotating attachment assembly may be used. A rotating attachment assembly may be lighter, simpler, and/or less expensive than a hinged attachment assembly. Example embodiments of a rotating attachment assembly may be described in connection with FIGS. 8-10.

Railway cars, such as railway car 180, carry automobiles 102 from manufacturing plants to distributors or other shipping lines. Other industrial shipping vessels and containers are also used to transport automobiles 102. Automobile 102 may be locked in place during any of the above mentioned shipping methods. For example, automobile 102 may be locked in place to prevent damage that may be caused to one or more of automobile 102 itself, the railway car, the railway crew, and/or other items being shipped. Such damage may be caused by automobile 102 rolling around the inside of railway car 180. Further, accidents may occur that cause automobile 102 and other automobiles on board railway car 180 to sustain latent damage that may not be found by routine inspection. This latent damage may pose a hidden risk to unknowing consumers who purchase vehicles that have been involved in freight shipping accidents. For example, manufacturers may prefer to replace a damaged fender than to detect and correct structural damage to cars involved in severe shipping accidents.

Certain vehicle restraint systems may secure a vehicle to a rail car with a cantilevered wheel chock. The cantilevered wheel chock may attach to a raised "hat shaped" track (e.g., chock track 104) mounted to the deck of rail car 180. The chock track may be located outboard on a side of the vehicle. The chock track may also be attached to the deck of the rail car and/or other transport vehicle, ship, or plane.

Traditional vehicle restraint systems may interface with the raised chock track and attach to it. For example, wheel chocks may straddle the chock track and lock into position using a lock pin that can be placed through a hole or holes in the sides of the chock track, similar to lock pin 150 from FIG. 1. These wheel chocks may secure vehicles to the railcar by chocking both the front and back sides of the wheel. A strap connecting both wheel chocks may then be applied over a portion of the wheel (i.e., over the top of the wheel in the wheel well). The strap may then be tightened in order to secure the vehicle to the deck of the railcar.

However, restraining vehicles, such as automobile 102, using traditional restraint methods may be increasingly difficult due to the recent popularity of decreased tire to fender clearance ratios in automobile designs. For example, certain automobile manufacturers may produce new lines of cars that have a decreased front fender to front wheel clearance ratio. These designs may be popular for reducing drag and improving fuel efficiency. These designs may also be popular with users because of their aesthetic appeal.

Fender to wheel clearance may refer to the distance between any portion of the body of the vehicle and a tire of the vehicle. For example, the front fender may be raised approximately 8 inches off the ground and may be 4 inches from the front of the front-side tires. Fender to wheel clearance may pose a problem for vehicle restraint systems because of the small area provided for inserting a chock and strap system. In the above example, if the top of chock track 104 sits 5 inches off the ground and the front fender is only 8 inches off the ground, the vehicle restraint system may have only 3 inches of clearance before making contact with the bottom of the front fender of vehicle 102. Thus, vehicle restraint systems sitting on top of chock track 104 may contact the bottom of the front fender of vehicle 102. This may prevent the vehicle restraint system from functioning properly, and may damage the bottom of the front fender of vehicle 102.

Restraining vehicles with low fender to wheel clearance ratios, such as described above, may be difficult using traditional vehicle restraint techniques because existing systems have components within the body of the wheel chock. This may require a higher chock body profile due to the size of the interior components. For example, some chocks may have a mandrel inside the body of the wheel chock. The mandrel may need to be positioned at least high enough to clear the chock track. Thus, it may not be possible to secure certain vehicles using existing wheel chocks.

Additionally, traditional wheel chocks may lift up towards the fender and wheel during tightening processes. For example, the lock pin may be smaller in diameter than the track hole, which may allow the wheel chock to move during normal tightening procedures. This may cause the wheel chock to hit the fender and cause damage to the vehicle.

In certain embodiments, the teachings of the present disclosure may enable one of ordinary skill in the art to prevent and/or mitigate the risks of damaging vehicles during installation of wheel chocks. The teachings of the present disclosure may further enable cars with low clearance levels around the lower portion of their wheels to be properly secured.

In certain embodiments, railway car 180 regularly applies incidental forces on vehicle 102 during shipping operations due to one or more of acceleration, deceleration, and coupling with other railway cars. Railway car 180, less frequently, applies more extreme forces on vehicle 102 during shipping operations due to high impact collisions (e.g., collisions with other railway cars, high-speed coupling, emergency stops, and railway car failure). Such extreme forces may be transferred directly to the suspension of vehicle 102 when vehicle 102 is restrained using industry standard restraints. Such extreme forces may permanently damage the suspension of vehicle 102, often in a manner that is difficult to detect. Vehicle restraint system 100 may be configured to statically restrain vehicle 102 when incidental forces are applied, but may release vehicle 102 once a predetermined force threshold is reached or exceeded. For reasons discussed below in more detail, releasing vehicle 102 once a force threshold is reached or exceeded may reduce hidden suspension damage, wear, and other problems that are caused by such extreme movement in railway cars. In addition, vehicle restraint system 100 may allow for one or more of additional railway car height clearance, retrofitting of various components associated with existing restraint systems, installation, and maintenance.

As used herein, "inboard" refers to one or more locations inside or on a line drawn between the exterior portions of one or more tires of a vehicle, such as in front of the rear tire or in rear of the front tire. As used herein, "outboard" refers to one or more locations outside of such line, such as in rear of the rear tire or in front of the front tire.

As used herein, "envelope" of a vehicle refers to an outer boundary around the exterior portion of the vehicle.

As used herein, "latent damage" refers to damage to a vehicle that is not visible on the exterior of the vehicle.

Figure 2:
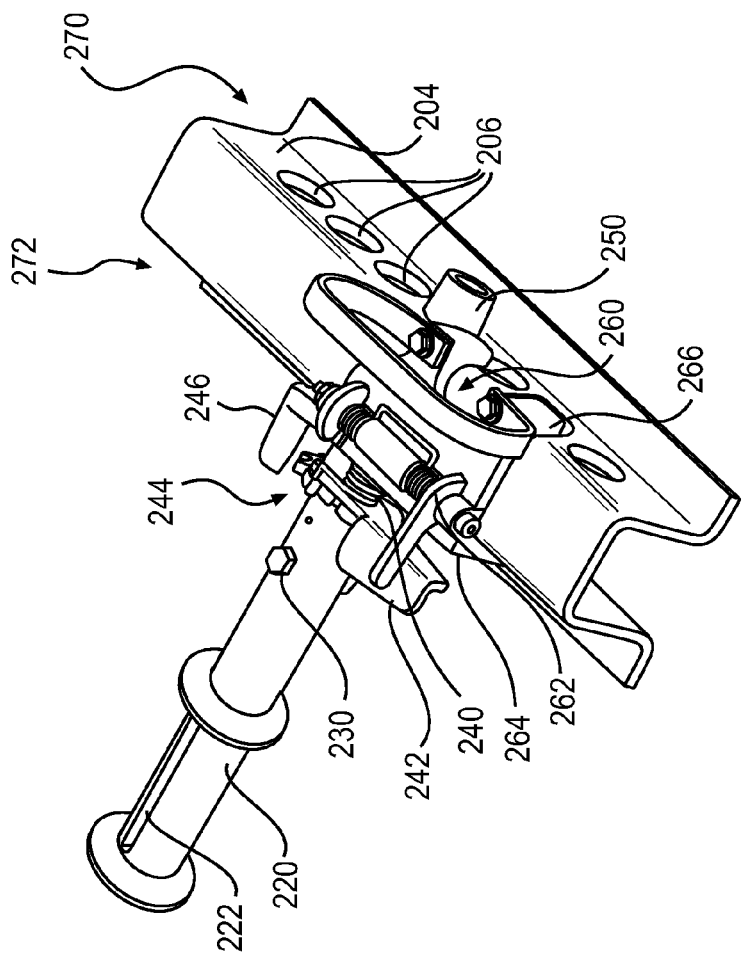
FIG. 2 illustrates a close up perspective view of a vehicle restraint system in accordance with a particular non-limiting configuration.

With reference to FIG. 2, a strap assembly belt may feed into a strap assembly receiving section 222 of mandrel assembly 220 such that it may be tightened against portion of a tire of a vehicle by rotating a lock pin assembly 250 along its axis. For example, lock pin assembly 250 is coupled to mandrel assembly 220 by a release mechanism 230 and is disposed adjacent to release mechanism 230 and mandrel assembly 220. In certain embodiments, lock pin assembly 250 is part of mandrel assembly 220. In certain embodiments, lock pin assembly 250 is coaxial to mandrel assembly 220. In certain embodiments, the axes of lock pin assembly 250 and mandrel assembly 220 are coaxial.

Release mechanism 230 may be coupled to mandrel assembly 220. Release mechanism 230 is set to relay the tightening force from lock pin assembly 250 to mandrel assembly 220, such that mandrel assembly 220 rotates slack out of the strap assembly to tighten the strap assembly around the portion of the tire of the vehicle. Accordingly, the vehicle may be held in place by the vehicle restraint system. A strap assembly belt may be composed of one or more of nylon, rubber, and cloth.

In certain embodiments, the vehicle restraint system may be an anchor chock. For example, the vehicle restraint system may include only mandrel assembly 220 lock pin 250 and attachment assembly 260. The anchor chock may not have any tightening functionality. Rather, the anchor chock may hold the strap assembly at a fixed position so that the strap assembly may be tightened around a portion of the tire on an opposite side of the tire of the vehicle.

In certain embodiments, the anchor chock may be locked in position by engaging lock pin 250 in a hole 206 of chock track 204. Attachment assembly 260 may rotate on its hinges over the top of chock track 204 in order to prevent the anchor chock from transverse or rotational movements.

In certain embodiments, a primary chock may include the chock illustrated in FIG. 2. For example, the primary chock may include mandrel 220, release mechanism 230, winch 240, lock pin 250, and attachment assembly 260. The primary chock may be positioned on an opposite side of a tire as the anchor chock. The primary chock may include tightening functionality. For example, the primary chock may receive a rotational force at a first end of lock pin 250 that extends beyond chock track 204. Lock pin 250 may transmit the rotational force through release mechanism 230 to strap receiving section 222 of mandrel 220. The rotational force causes strap receiving section 222 to rotate and tighten the strap assembly around a portion of the tire.

Release mechanism 230 may include a mandrel coupling rod and a release threshold mechanism. In certain embodiments, the mandrel coupling rod is disposed adjacent to the lock pin on one side. The mandrel coupling rod is disposed adjacent to the mandrel assembly on another side and is coupled to the mandrel assembly. The mandrel coupling rod includes a collar with an interior diameter greater than an exterior diameter of the winch assembly. The mandrel coupling rod and the lock pin assembly are disposed adjacent to each other and are configured such that the collar of the mandrel coupling rod covers an end of the lock pin assembly. The mandrel coupling rod and the lock pin assembly are coaxially disposed, such that a rotating axis of the mandrel coupling rod and a rotating axis of the lock pin assembly are disposed substantially inline. The mandrel coupling rod allows winch assembly 240 to be disposed outside the envelope of the vehicle, which provides unobstructed access for manual operation when tightening and releasing the strap assembly while loading and unloading vehicles from the shipping car.

Release mechanism 230 may have a predetermined release threshold. In particular embodiments, the release threshold is based on the modulus of a shear pin. The shear pin may include one or more of a rod and a bolt inserted radially through shear pin holes formed in the mandrel coupling rod and the lock pin assembly. In particular embodiments, both the collar of the mandrel coupling rod and the end of the lock pin assembly include shear pin holes through which the shear pin may be inserted and engaged. When the shear pin is engaged, the mandrel coupling rod and the lock pin assembly may be coupled together. A force is transmitted from lock pin assembly 250 through mandrel assembly 220 to the strap assembly. When the shear pin is broken (e.g. with a shearing force), or otherwise disengaged from at least one of lock pin assembly 250 and mandrel assembly 220, the mandrel coupling rod and the lock pin assembly decouple and mandrel 220 may release a tension applied to the strap assembly. One or more of the thickness and strength of the rod of the shear pin may be changed to obtain a particular release threshold (e.g. breakaway, shearing, or release strength).

For example, a ⅛ inch shear pin may be used to restrain a light vehicle during a high impact collision at over 8 mph. The shear pin strength and width may be selected to break during collisions over 6-10 mph. A larger vehicle may require a shear pin with higher strength in order to restrain the vehicle for the same range. In another embodiment, a shear pin is selected such that the shear pin breaks during a collision at over 4 mph.

In another embodiment, a ⅛ inch grade 8 shear pin may withstand a force of up to 9 inch pounds (in lbs). In another example, a shear pin may withstand 6-12 in lbs before shearing. In still a further example, the shear pin may withstand up to 20 in lbs of force before shearing.

The shear pin may be replaced to modify the release threshold of the vehicle restraint system. In one example, the shear pin is inexpensive and readily replaced by pressing out the ends of the installed shear pin (e.g. broken or unbroken) and inserting a new shear pin. Release mechanism 230 may include alignment holes formed therein, which are disposed adjacent to the shear pin holes and assist in aligning the shear pin holes of the mandrel coupling rod and the winch assembly.

One or more of other torque limiting, force limiting, and disconnecting devices may be employed in release mechanism 230 in lieu of a shear pin (e.g., a friction plate limiter or ball detent disconnect). Such other devices may employ coupling rods, or, alternatively, may be disposed directly adjacent to one or more of lock pin assembly 250 and mandrel assembly 220. For example, release mechanism 230 may be a friction limiting plate that is disposed between one or more coupling rods in release mechanism 230 and may be coupled to an end of each of the one or more coupling rods. Extreme forces produced while transporting vehicles are dissipated by one or more of the torque limiting, force limiting, and disconnecting devices, which allow the strap assembly to loosen.

Certain configurations may not employ coupling rods, but may employ a torque limiting device directly between mandrel assembly 220 and lock pin assembly 250. Further configurations may include magnetic based torque limiting devices. Still other configurations may include torque limiting devices that give way, but do not break or shear when the predetermined force threshold is reached.

Other embodiments may not include coupling rods in release mechanism 230 or may include a winch coupling rod coupled directly to winch assembly 240 with release mechanism 230 disposed between the winch coupling rod and the mandrel assembly. Another configuration includes release mechanism 230 disposed in any other elements presented in the present disclosure. Any combination of the above examples may be used in connection with the disclosure.

In certain embodiments, vehicle restraint system 100 may include winch 240. Winch 240 may be disposed on mandrel assembly 220 and lock pin assembly 250. Winch gear lock 242 and winch gear teeth 244 may incrementally allow rotation of mandrel assembly and lock pin 250. When winch gear lock 242 is engaged, mandrel assembly 220 may only rotate in one direction (i.e., the tightening direction). Winch gear lock 242 may prevent mandrel assembly 220 and lock pin assembly 250 from releasing the tightening force.

In certain embodiments, winch gear lock 242 may be disengaged from winch gear 244. When winch gear lock 242 is disengaged from winch gear 244, mandrel assembly 220 and lock pin 250 may rotate freely. Thus, the tension force applied to the strap assembly to keep the strap assembly locked in place around the tire of the vehicle may be released by releasing winch gear lock 242.

In certain embodiments, winch gear lock 242 may be released manually by hand. For example, an employee may release winch gear lock 242 with her foot while unloading vehicles from a rail car. In certain embodiments, a special device or tool may be used to release winch gear lock. For example, a wrench or special device including a handle may be used to release winch gear lock 242.

In certain embodiments, winch 240 includes a winch gear guard 246. Winch gear guard 246 may protect tires from contacting moving and/or sharp portions of winch gear 244.

In certain embodiments, attachment assembly 260 includes a base 264, a hinge 262, and a lock tab 266. Attachment assembly is coupled to mandrel assembly 220 and lock pin 250. When lock pin 250 is engaged with chock track 204, attachment assembly 260 may be disposed on a first side of chock track 204.

In certain embodiments, hinge 262 couples lock tab 266 to base 264 of attachment assembly 260. Lock tab 266 may swing over chock track 204. For example, lock tab 266 may rotate around hinge 262 such that lock tab 266 is positioned on a second side of chock track 204. Lock tab 266 may engage a second hole 206 in chock track 204. When lock tab 266 is engaged with chock track 204 and lock pin 250 is engaged with a hole 206 in chock track 204, mandrel assembly 220 may be secured to track assembly 204.

In certain embodiments, attachment assembly 260 may prevent mandrel assembly 220 from moving transverse to the axis of mandrel assembly 220. In certain embodiments, attachment assembly 260 may prevent lock pin 250 from rotating in chock track hole 206. In certain embodiments, attachment assembly 260 may prevent mandrel assembly 220 and lock pin 250 from disengaging chock track hole 206. For example, lock pin 250 may be pushed and/or pulled axially out of chock track 204 hole 206. Attachment assembly 260 may prevent axial movements in the mandrel assembly.

In certain embodiments, attachment assembly 260 includes a handle for engaging and disengaging attachment assembly 260 to and from chock track 204.

The depicted embodiment in FIG. 2 shows merely one type of attachment assembly 260; however, many other configurations are possible. For example, in certain embodiments, a rotating attachment assembly may secure mandrel 220 to chock track 204. Other types of attachment assemblies that prevent mandrel assembly 220 from axial and/or transverse movements may be utilized in addition to and/or in substitution of attachment assembly 260.

Figure 3:
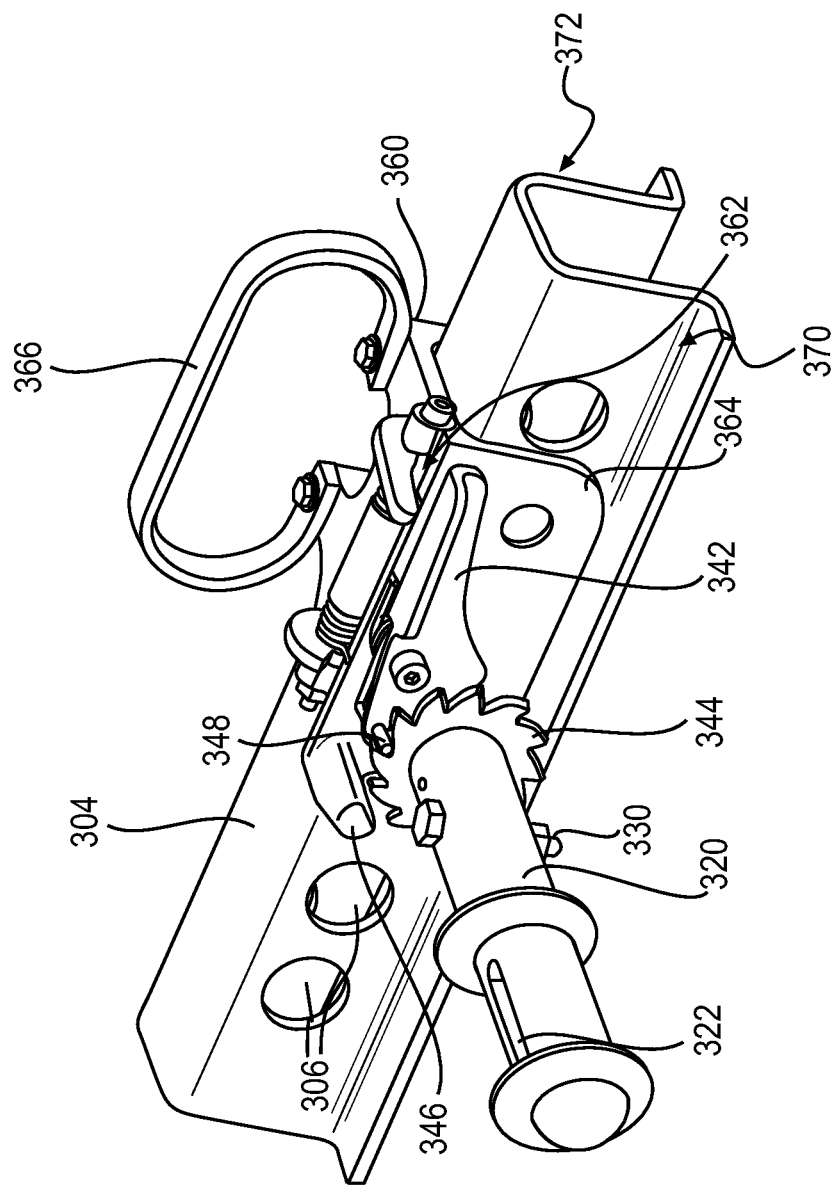
FIG. 3 illustrates a close up perspective view of a vehicle restraint system in accordance with a particular non-limiting configuration.

With reference to FIG. 3, another perspective view of a vehicle restraint system is illustrated. In the illustrated configuration, a railway car (i.e., transport) transports one or more vehicles that each have one or more tires restrained by a vehicle restraint system. The strap assembly is coupled to chock track 304 of the transport on a first side of a tire. The first side refers to one or more of the inboard and outboard sides of a tire. The strap assembly is coupled to mandrel assembly 320 using strap assembly receiving section 322. Mandrel assembly 320 and winch assembly 340 are coupled to chock track 304 on a second side of the tire. The second side refers to one or more of the inboard or outboard sides of the tire. The strap assembly is tightened around one or more portions of the tire through mandrel assembly 320 by lock pin 350. Release mechanism 330 couples lock pin 350 to mandrel assembly 320, and releases the coupling between lock pin 350 and mandrel assembly 320 when a predetermined threshold force is exceeded between lock pin 350 and mandrel assembly 320.

The transport may include one or more of a railroad car, truck, boat, airplane, and other machine suitable for transporting one or more vehicles. In certain configurations, the transport is a tri-level railroad car comprising three decks, such that each deck can transport one or more vehicles. The vehicle in the above configuration refers to one or more of an automobile, truck, jeep, or any machine having one or more tires. In certain configurations, the transport includes a chock track 304 coupled to a deck of the transport. Chock track 304 may be disposed parallel to the vehicle tire In certain embodiments, the strap assembly includes cleats which may fit inside the treads of the tire. Such cleats may provide traction between tires and the strap assembly belt when the vehicle shifts/changes positions in the transport. Cleats may also translate forces between the strap assembly belt and tire.

In certain embodiments, winch gear lock 342 is disposed adjacent to a rotating winch gear 344. Winch gear lock 342 engages winch gear 344. Winch gear 344 may contain sprockets. Winch gear lock 342 may engage winch gear 344 sprockets such that winch gear 344 may not rotate in one rotational direction. For example, winch 340 may prevent mandrel assembly 322 from rotating in one rotational direction when winch gear handle 342 is engaged with winch gear 344 sprockets. Winch 340 may also prevent the lock pin assembly from rotating in one rotational direction.

The illustration in FIG. 3 shows a first side 370 and a second side 372 of chock track 304. Attachment assembly 360 base 364 and hinges 362 may be positioned on the first side of chock track 304. When attachment assembly 360 lock tab is engaged with first side 370 of chock track 304, mandrel assembly 320 is substantially fixed in place. In certain embodiments, attachment assembly 360 prevents mandrel assembly 320 from moving transversely across mandrel assembly 320's axis. In certain embodiments, attachment assembly 360 prevents mandrel assembly 320 from rotating. In certain embodiments, when the lock pin and attachment assembly 360 are engaged with chock track 304, mandrel assembly 320 is fixedly coupled to chock track 304.

In certain embodiments, attachment assembly 360 may rotate on hinges 362 across chock track 304 to second side 372 of chock track 304. When attachment assembly 360 is placed across chock track 304, attachment assembly 360 may secure the vehicle restraint system in place.

Figure 4:
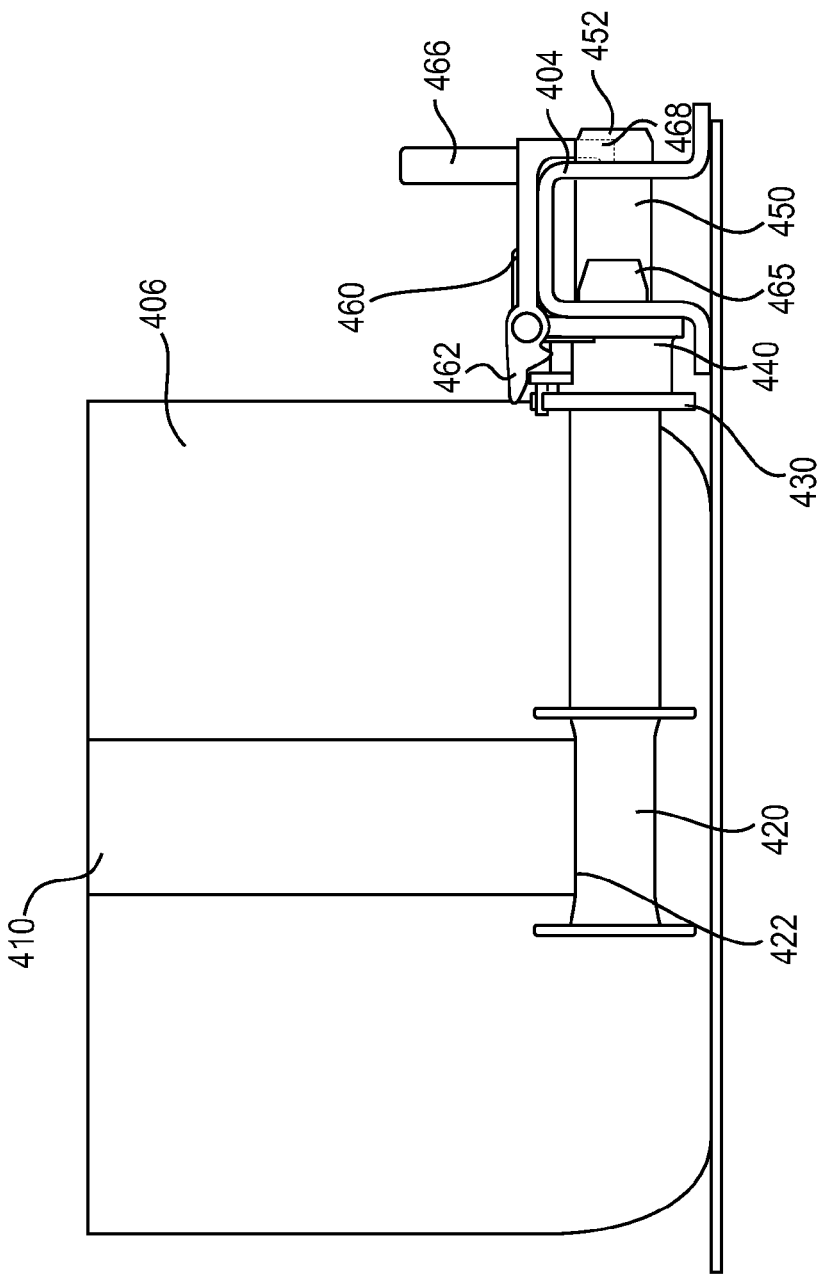
FIG. 4 illustrates a front view of a vehicle restraint system in accordance with a particular non-limiting configuration.

With reference to FIG. 4, a side view of a vehicle restraint system is illustrated in accordance with a non-limiting embodiment of the present disclosure. Mandrel assembly 420 strap receiving section receives a strap assembly positioned around a portion of a tire 410 of a vehicle. Mandrel assembly 420 is coupled to lock pin assembly 450. In certain embodiments, mandrel assembly 420 and lock pin assembly 450 are welded together. In certain embodiments, mandrel assembly 420 and lock pin assembly 450 are a single metal and/or plastic cylinder. In certain embodiments, mandrel assembly 420 may fit inside lock pin assembly 450.

In certain embodiments, lock pin assembly 450 may have a cylinder shape with a variable diameter. For example, lock pin assembly 450 diameter may narrow at one end to interlock with mandrel assembly 420. In certain embodiments, lock pin assembly 450 may be larger at another end, such that lock pin assembly 450 may fit inside chock track holes.

In certain embodiments, attachment assembly 460 includes a lock tab 465. Lock tab 465 may engage a chock track 404 hole. The combination of lock pin 450 and lock tab 465 engaging different chock track 404 holes may prevent the mandrel assembly from rotating and/or moving with respect to chock track 404 and vehicle tire 406. For example, in certain vehicle restraint systems, the force of tightening a strap assembly may cause the mandrel assembly to move up and down. The vehicle or operator may produce a tension force that may also cause mandrel assembly to rotate or come in contact with surfaces of the vehicle, for example, the vehicle fender. Attachment assembly 460 lock tab 465 may prevent transverse and rotational movements by mandrel assembly 420 during operator installation. Lock tab 465 may also prevent mandrel assembly 420 from movement with respect to chock track 404 during carrier accidents and/or external forces.

In certain embodiments, attachment assembly 460 has a handle 466 to enable operators to secure the vehicle restraint system in place on chock track 404. For example, an operator may insert lock pin 450 and attachment assembly 460 lock tab 465 into holes in chock track 404 such that a first end 452 of lock pin 450 extends through chock track 404. Lock pin 450 first end 452 may poke through another hole in chock track 404. In certain embodiments, the operator may use attachment assembly 460 handle 466 to secure the vehicle restraint system in place with respect to chock track 404 by pressing attachment assembly handle 466 down across chock track 404. When the handle is engaged in this manner, attachment assembly 460 may prevent mandrel assembly 420 from movement in its axial direction.

For example, if attachment assembly handle 460 is not engaged with chock track 404, lock pin 450 and attachment assembly lock tab 465 may slide out of chock track 404 holes. Mandrel assembly 420 may then come lose from chock track 404. However, engaging attachment assembly 460 across chock track 404 stabilizes the vehicle restraint system, such that some axial movement may be prevented.

Engaging attachment assembly 460 across both sides of chock track 404 may also stabilize the vehicle restraint system to prevent rotation of mandrel assembly 420. In certain embodiments, engaging attachment assembly 460 may prevent mandrel assembly 420 from moving transversely to its axis.

In certain embodiments, a transport may experience external forces during the normal course of shipping. These external forces may caused by one or more of acceleration and deceleration, coupling and decoupling, transport failure, collisions with trains, vehicles, railway buffer stops, docks, vessels, and turbulence. For example, one or more of these external forces may move the vehicle from its static position on a deck of the rail car. As the vehicle moves, tire 406 rotates and skids across the deck surface. Tire 406 rotation and/or skidding may produce a force counter to the restraining force applied by winch assembly 440. Such counter-force may be relayed through mandrel assembly 420 and release mechanism 430 to winch assembly 440. Such counter-force may be greater than the predetermined threshold of release mechanism 430. Release mechanism 430 may release the coupling between winch assembly 440 and mandrel assembly 420, such that mandrel assembly 420 rotates freely around an axis and strap assembly 410 unwinds. When the strap assembly 410 coupling is released from mandrel assembly 420, the vehicle restraint system may allow tire 406 to one or more of roll and skid. The vehicle restraint system may allow tire 406 and the vehicle to move without restraint and can release the load or force of a collision from the suspension of the vehicle. In such an example, the vehicle restraint system may prevent latent damage to the suspension of the vehicle.

The vehicle restraint system may be configured to work with anchor chocks and/or belts that are currently available in the field. For example, the vehicle restraint system is configured with anchor chocks and/or belts that other manufacturers produce. In certain configurations, an existing belt is fed through mandrel assembly 420 receiving section 422 and is coupled to mandrel assembly 420 for restraining tire 406. The existing belt is used as strap assembly belt 410. Such use may save users of traditional vehicle restraint systems replacement costs by enabling re-use of existing equipment in the vehicle restraint system.

In certain configurations, the vehicle restraint system is configured to use industry standard sized straps. Small straps may be vulnerable to edge tears, abrasion and wear, and may be susceptible to unreliable breaking tolerances. Additionally, required vehicle height clearance may not increase by use of the vehicle restraint system because strap assembly 410 may hug tire 406 tread. For example, because strap assembly 410 holds the vehicle in place, a high impact collision may not subject the vehicle to roof damage from scraping the top of the transport.

Figure 5:
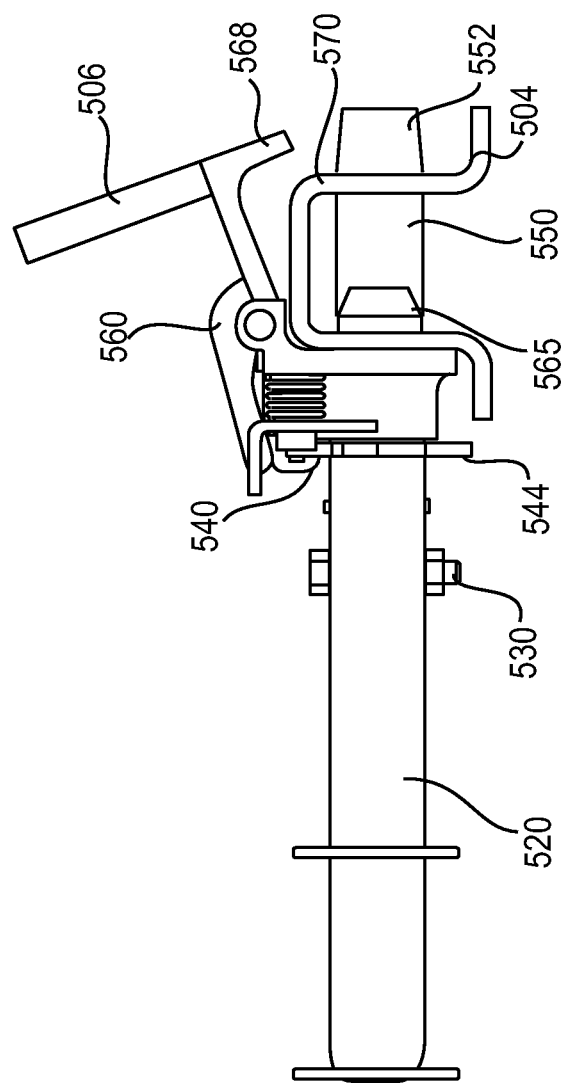
FIG. 5 illustrates a front view of a vehicle restraint system in accordance with a particular non-limiting configuration.

FIG. 5 illustrates a side view of one embodiment of a vehicle restraint system, when attachment assembly 560 is not engaged with both sides of chock track 504. For example, an operator may position the vehicle restraint system on chock track 504 as illustrated in FIG. 5 before locking the vehicle restraint system in place by engaging attachment assembly 560 with the second side of chock track 504. Mandrel 520, release mechanism 530, winch 540, and lock pin 550 are also shown.

In certain embodiments, an operator may push attachment assembly handle 506 down to engage attachment assembly 560 with the second side of chock track 504. Attachment assembly 560 may rotate along a hinged base. The hinged base of attachment assembly 560 may include a lock tab 565. Lock tab 565 may engage a chock track 504 hole. This hole may be a different hole from the chock track 504 hole that lock pin 550 engages.

In certain embodiments, lock pin 550 extends through a second side of chock track 504 so that a tightening force may be applied to lock pin 550. For example, lock pin 550 may receive a tightening force from a hexagonal wrench on one side 552. Lock pin 550 may transmit the tightening force received to the strap receiving section of mandrel assembly 520.

In certain embodiments, lock pin 550 also translates the tightening force to mandrel assembly 540. This may cause winch assembly gear teeth 544 to rotate. A winch gear lock may allow mandrel assembly 520 to rotate in the tightening direction but may not allow mandrel assembly 520 to rotate in the opposite direction when the winch gear lock is engaged with winch gear teeth 544. For example, when the winch gear lock is engaged with the winch gear teeth, the winch gear lock may allow rotation of mandrel assembly 520 in a clockwise direction, but may not allow rotation of mandrel assembly 520 in a counterclockwise direction.

Figure 6:
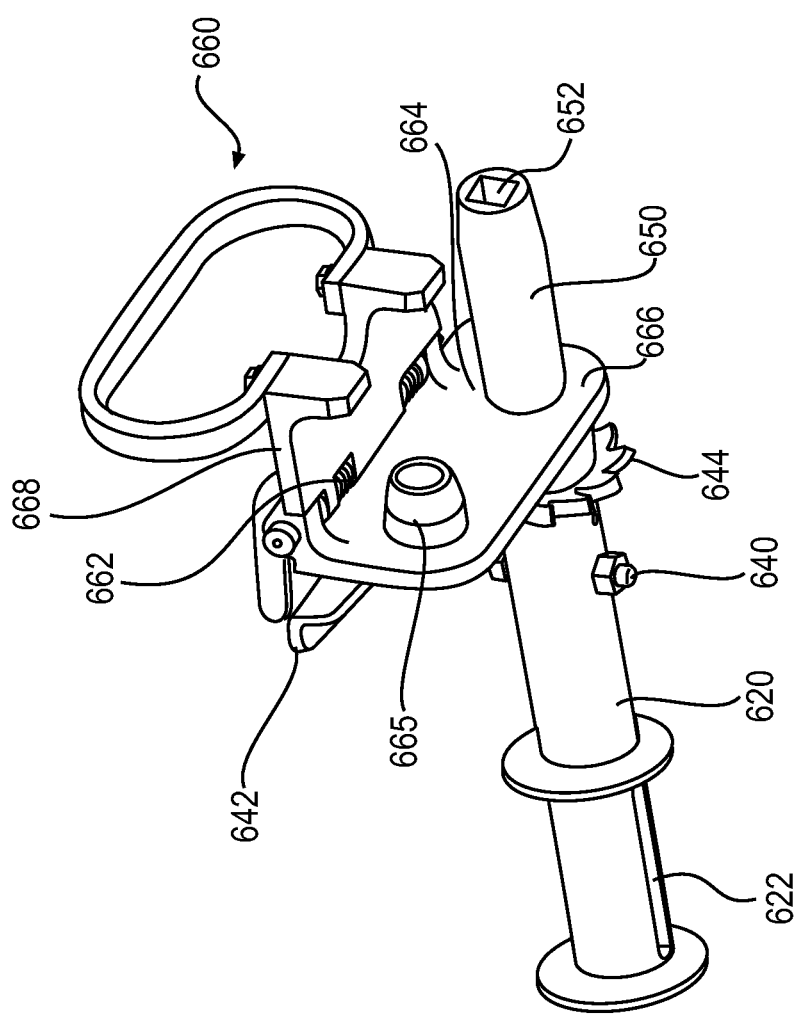
FIG. 6 illustrates a perspective view of a vehicle restraint system in accordance with a particular non-limiting configuration.

With reference to FIG. 6, a vehicle restraint system is shown in accordance with another embodiment of the present disclosure. Attachment assembly 660 lock tab 665 and lock pin 650 are shown disconnected from a chock track. However, attachment assembly 660 is positioned as if it would be around both sides of a chock track. In certain embodiments, attachment assembly 660 includes attachment tabs 668. When attachment assembly 660 is engaged with a chock track, the chock track may be held between attachment tabs 668 and attachment assembly base 666. Further, lock tab 665 may engage a hole in the chock track to further hold the vehicle restraint system in place.

Figure 7:
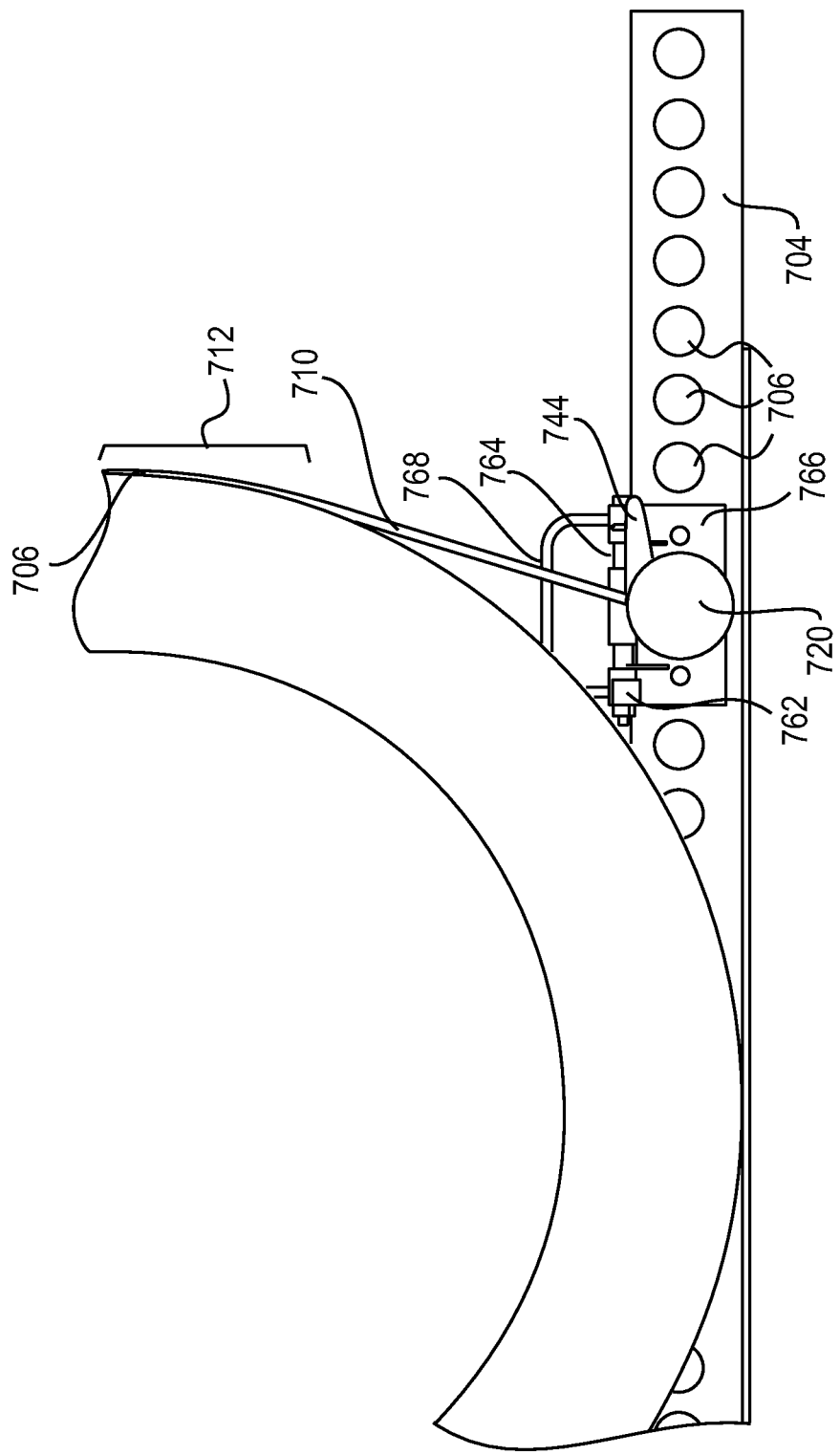
FIG. 7 illustrates a side view of a vehicle restraint system in accordance with a particular non-limiting configuration.

FIG. 7 illustrates a front view of a vehicle restraint system. Tire 706 of a vehicle may be restrained by strap assembly 710. In the illustrated embodiment, strap assembly 710 is coupled to chock track 704 such that a strap assembly belt is disposed flush against tire 706. The strap assembly belt is disposed central to tire 706 tread, around a portion 712 of the circumference of tire 706. Strap assembly 710 is coupled to mandrel assembly 720. Mandrel assembly 720 is disposed on an opposite side of tire 32 from a strap assembly anchor chock.

Figure 8:
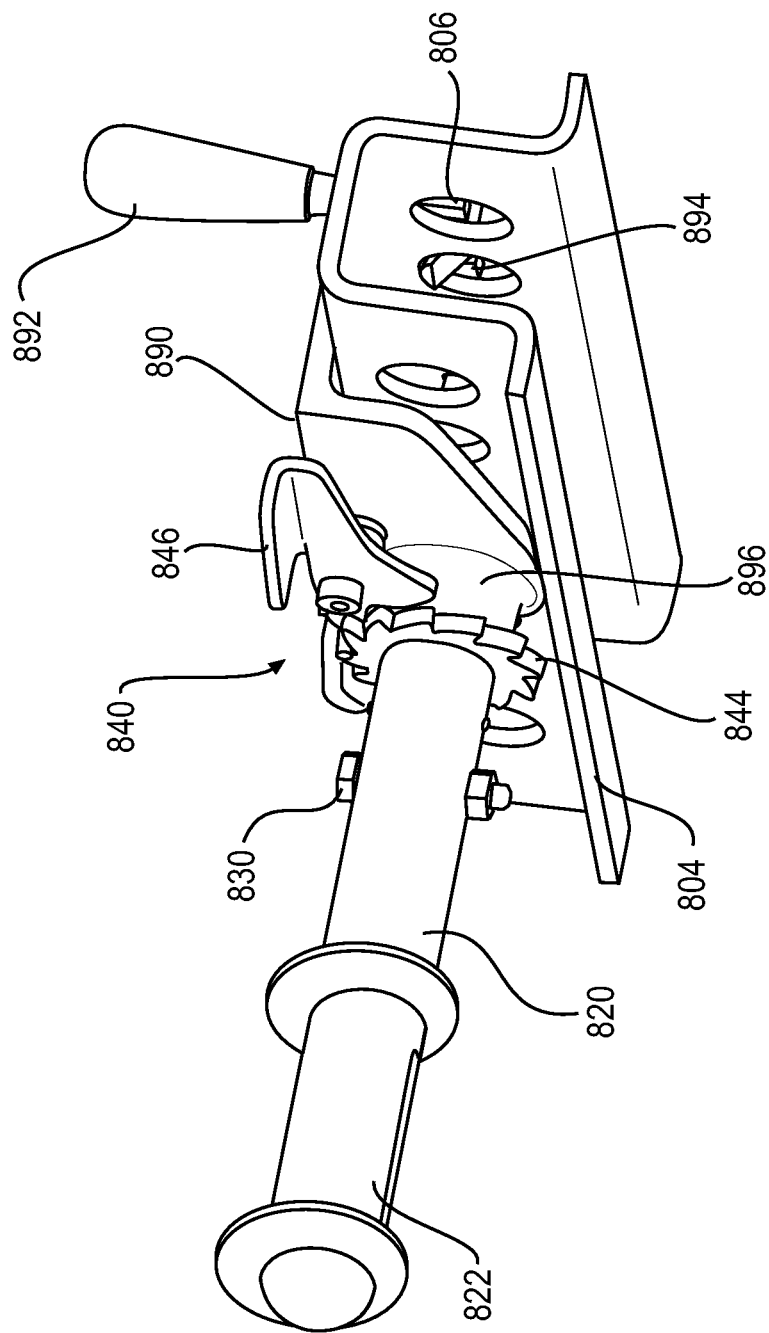
FIG. 8 illustrates a perspective view of a vehicle restraint system in accordance with a particular non-limiting configuration.

FIG. 8 illustrates another view of a vehicle restraint system engaged with a chock track 804. In this embodiment, a rotating attachment assembly 890 is illustrated, as opposed to the hinged attachment assembly illustrated in FIGS. 1-7. The rotating attachment assembly 890 is positioned on chock track 804 when the lock pin is engaged with a chock track hole 806. The rotating attachment assembly 890 is then rotated down onto chock track 804 using attachment assembly handle 892 such that attachment assembly 890 is flush against the top of chock track 804.

In certain embodiments, rotating attachment assembly 890 has a lock tab 894 that may be positioned in a chock track hole 806. Lock tab 894 may prevent attachment assembly 890 from moving with respect to chock track 804. In certain embodiments, any type of attachment assembly may be used to attach the single-body mandrel assembly 820 and lock pin assembly to chock track 804.

Figure 9:
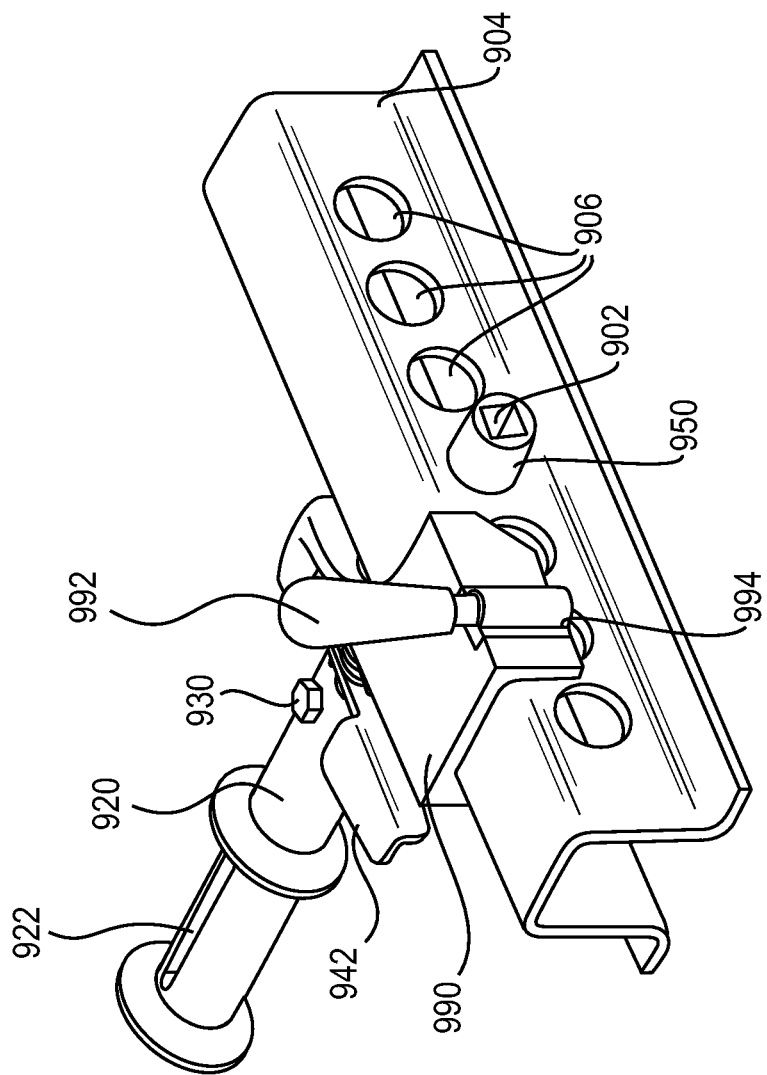
FIG. 9 illustrates a perspective view of a vehicle restraint system in accordance with a particular non-limiting configuration

With reference to FIG. 9, the rotating attachment assembly of FIG. 8 is illustrated in accordance with another embodiment of the present disclosure. Attachment assembly 990 may be positioned on top of chock track 904 while lock pin 950 is engaged with a chock track 904 hole 906. An operator may rotate attachment assembly 990 down using handle 992 such that the body of attachment assembly 990 is flush against the chock track 904. Lock tab 994 may fit inside a chock track 904 hole 906 to further secure the vehicle restraint system in place.

In certain embodiments, lock pin 950 may receive a tightening force at a first side 902 and transmit that tightening force to mandrel assembly 920 strap assembly receiving section 922. The tightening force may produce a tension force against the tire. The tension force may be locked in place by winch assembly 940 gear lock 942. The tension may be release by pressing gear lock 942.

Figure 10:
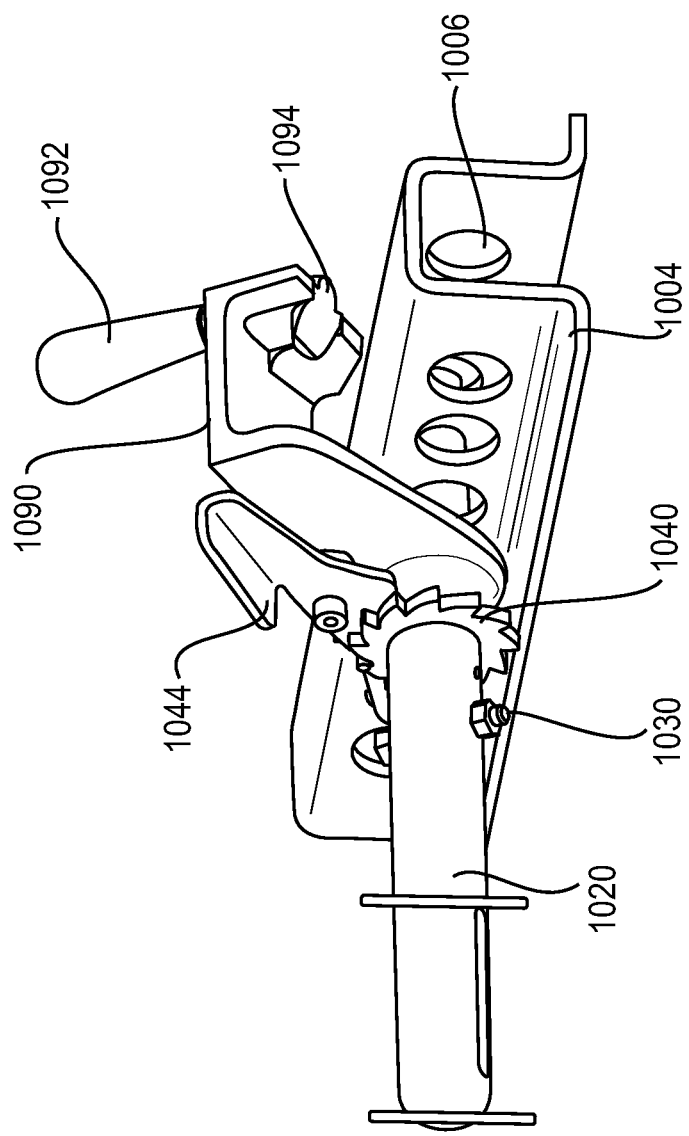
FIG. 10 illustrates a perspective view of a vehicle restraint system in accordance with a particular non-limiting configuration.

With reference to FIG. 10, a vehicle restraint system is illustrated with a rotating attachment assembly 1090. Rotating attachment assembly 1090 may be illustrated as being disengaged from chock track 1004. When rotating attachment assembly 1090 is positioned in this way, the vehicle restraint system may be disengaged from chock track 1004. For example, when removing vehicles from a rail car, rotating attachment assembly 1090 may be positioned in this way such that the vehicle restraint system may be removed, and the vehicle may be offloaded from the rail car.

While the disclosure has been described in connection with various configurations, it will be understood by those of ordinary skill in the art that other variations and modifications of the various configurations described above may be made without departing from the scope of the disclosure. Other configurations will be apparent to those of ordinary skill in the art from a consideration of the specification or practice of the configurations of the disclosure disclosed herein. The specification and the described examples are considered as exemplary only, with the true scope and spirit of the configurations of the disclosure indicated by the following claims.

What is claimed is:
1. A vehicle restraint system, comprising:
a strap assembly configured to be positioned on a portion of a tire of a vehicle to secure the vehicle to a track assembly, and configured to be coupled to the track assembly on a first side of the tire;
a mandrel assembly comprising a rod operable to be coupled to the strap assembly on a second side of the tire, opposite the first side of the tire, the rod comprising a lock pin that is configured to engage the track assembly through a first hole in the track assembly, wherein the lock pin and the mandrel assembly rotate on a common axis; and an attachment assembly configured to be coupled to the mandrel assembly, and configured to create a coupling between the mandrel assembly and the track assembly.

2. The system of claim 1, wherein the mandrel assembly is further configured to:

receive a torque force on a first side of the track assembly; and produce a tightening force to tighten the strap assembly around the portion of the tire on a second side of the track assembly.

3. The system of claim 1, further comprising:

a winch assembly configured to be coupled to the mandrel assembly on the second side of the tire, the winch assembly configured to rotate the mandrel assembly to produce a tightening force to tighten the strap assembly around the portion of the tire.

4. The system of claim 3, further comprising a release mechanism disposed between the winch assembly and the mandrel assembly and configured to create a coupling between the winch assembly and the mandrel assembly in a manner that transmits the tightening force from the winch assembly to the mandrel assembly, wherein the release mechanism is configured to release the coupling between the winch assembly and the mandrel assembly when a force greater than or equal to a predetermined force is produced against the release mechanism.

5. The system of claim 4, wherein the release mechanism comprises a shear pin.

6. The system of claim 1, wherein the attachment assembly is configured to create the coupling between the mandrel assembly and the track assembly by engaging a second hole in the track assembly.

7. The system of claim 1, wherein the attachment assembly is disposed on a second side of the tire of the vehicle, and is configured to create the coupling between the mandrel assembly and the track assembly by engaging a first side of the track assembly.

8. The system of claim 1, wherein an exterior surface of the mandrel assembly is configured to fit substantially flush against an interior surface of the first hole of the track assembly.

9. The system of claim 1, wherein the mandrel assembly is configured to be cantilevered to the track assembly.

10. The system of claim 1, wherein the track assembly is configured to be coupled to a deck of a transport.

11. The system of claim 1, wherein the lock pin is further configured to:

receive a torque force on a first side of the track assembly; and transmit the torque force to the rod to produce a tightening force to tighten the strap assembly around the portion of the tire on a second side of the track assembly.

12. A vehicle restraint system, comprising:

a strap assembly configured to be positioned on a portion of a tire of a vehicle to secure the vehicle to a track assembly, and configured to be coupled to the track assembly on a first side of the tire;

a mandrel assembly comprising a rod operable to be coupled to the strap assembly on a second side of the tire, opposite the first side of the tire, the rod configured to engage the track assembly through a first hole in the track assembly, wherein a center point of the first hole of the track assembly is in a line path of an axis of the mandrel assembly, wherein the mandrel assembly rotates on the axis; and an attachment assembly configured to be coupled to the mandrel assembly, and configured to create a coupling between the mandrel assembly and the track assembly.

13. A method for restraining a vehicle comprising:

positioning a strap assembly on a portion of a tire of a vehicle to secure the vehicle to a track assembly;

coupling the strap assembly to the track assembly on a first side of the tire;

receiving the strap assembly with a mandrel assembly comprising a rod on a second side of the tire, opposite the first side of the tire;

coupling the rod to the strap assembly on the second side of the tire, the rod comprising a lock pin;

engaging the track assembly with the lock pin through a first hole in the track assembly, wherein the lock pin and the mandrel assembly are configured to rotate on a common axis;

coupling the mandrel assembly to the track assembly using an attachment assembly, wherein the attachment assembly is coupled to the mandrel assembly.

14. The method of claim 13, further comprising:

receiving a torque force at the mandrel assembly on a first side of the track assembly; and producing a tightening force with the mandrel assembly on a second side of the track assembly, wherein the tightening force tightens the strap assembly around the portion of the tire.

15. The method of claim 13, further comprising:

rotating the mandrel assembly with a winch assembly to produce a tightening force, wherein the winch assembly is coupled to the mandrel assembly.

16. The method of claim 13, wherein coupling the mandrel assembly to the track assembly comprises engaging a second hole in the track assembly with the attachment assembly.

17. The method of claim 13, wherein coupling the mandrel assembly to the track assembly comprises engaging a first side of the track assembly with the attachment assembly, from the first side of the track assembly.

18. The method of claim 13, wherein the lock pin is further configured to:

receive a torque force on a first side of the track assembly; and transmit the torque force to the rod to produce a tightening force to tighten the strap assembly around the portion of the tire on a second side of the track assembly.

19. A method for restraining a vehicle comprising:

positioning a strap assembly on a portion of a tire of a vehicle to secure the vehicle to a track assembly;

coupling the strap assembly to the track assembly on a first side of the tire;

receiving the strap assembly with a mandrel assembly comprising a rod on a second side of the tire, opposite the first side of the tire;

coupling the rod to the strap assembly on the second side of the tire;

engaging the track assembly with the rod through a first hole in the track assembly, wherein a center point of the first hole of the track assembly is in a line path of an axis of the mandrel assembly, wherein the mandrel assembly rotates on the axis.

20. A vehicle restraint system, comprising:
- a strap assembly configured to be positioned on a portion of a tire of a vehicle to secure the vehicle to a track assembly, and configured to be coupled to the track assembly on a first side of the tire;
- a mandrel assembly comprising a rod operable to be coupled to the strap assembly on a second side of the tire, opposite the first side of the tire, wherein the rod comprises a lock pin and is configured to:
  - engage the track assembly, with the lock pin, through a first hole in the track assembly;
  - receive a torque force on a first side of the track assembly; and
  - produce a tightening force to tighten the strap assembly around the portion of the tire on a second side of the track assembly, wherein the lock pin and the mandrel assembly are configured to rotate on a common axis;
- an attachment assembly configured to be coupled to the mandrel assembly, and configured to create a coupling between the mandrel assembly and the track assembly by engaging a second hole in the track assembly; and
- a winch assembly configured to be coupled to the mandrel assembly on the second side of the tire, the winch assembly configured to rotate the mandrel assembly to produce a tightening force to tighten the strap assembly around the portion of the tire.

* * * * *